US009296467B1

(12) United States Patent
Hollibaugh et al.

(10) Patent No.: US 9,296,467 B1
(45) Date of Patent: Mar. 29, 2016

(54) PRESSURE TEST DOOR FOR USE WITH A FUEL TANK

(75) Inventors: Justin D. Hollibaugh, Covington, WA (US); William F. Williams, Buckley, WA (US); Melissa M. Linscott, Seattle, WA (US); Howard J. Tu, Seattle, WA (US); Martin D. Reynoldson, Tacoma, WA (US); James Martin, County Clare (IE)

(73) Assignee: The Boeing Company, Chicago, IL (US)

( * ) Notice: Subject to any disclaimer, the term of this patent is extended or adjusted under 35 U.S.C. 154(b) by 1385 days.

(21) Appl. No.: 12/481,037

(22) Filed: Jun. 9, 2009

(51) Int. Cl.
  *B65D 51/16*  (2006.01)
  *B64C 3/34*  (2006.01)
  *B64C 1/14*  (2006.01)

(52) U.S. Cl.
  CPC .................. *B64C 3/34* (2013.01); *B64C 1/1446* (2013.01)

(58) Field of Classification Search
  CPC ................................................ B65D 2539/006
  USPC .......... 220/806, DIG. 16, 80–804; 244/172.3, 244/129.4, 129.5; 215/45, 230, 270, 355, 215/363, 364; 116/270; 138/90; 141/94–96; 277/317, 318; 285/93; 296/1.06; 49/476.1, 477.1; 73/49.8, 52, 756, 762, 73/866.5; 99/342, 343, 493
  See application file for complete search history.

(56) References Cited

U.S. PATENT DOCUMENTS

| 37,647 | A | * | 2/1863 | Spencer | 215/364 |
| 38,600 | A | * | 5/1863 | Prosser | 215/360 |
| 39,327 | A | * | 7/1863 | Reid | 215/357 |
| 95,025 | A | * | 9/1869 | Kitchen | 215/290 |
| 99,763 | A | * | 2/1870 | Daniels | 215/364 |
| 187,714 | A | * | 2/1877 | King | 215/364 |
| 195,898 | A | * | 10/1877 | Lester | 220/323 |
| 228,696 | A | * | 6/1880 | Thompson | 215/352 |
| 323,153 | A | * | 7/1885 | Ives | 220/804 |
| 575,475 | A | * | 1/1897 | Fuller | 220/378 |
| 667,537 | A | * | 2/1901 | Lees | 220/804 |
| 671,977 | A | * | 4/1901 | Peacock | 220/801 |
| 769,498 | A | * | 9/1904 | Shalita | 220/804 |
| 979,183 | A | * | 12/1910 | Mackin | 215/200 |
| 1,148,666 | A | * | 8/1915 | Eberhart | 220/284 |
| 1,359,874 | A | * | 11/1920 | Culverwell et al. | 220/323 |
| 1,369,969 | A | * | 3/1921 | Fairbanks et al. | 220/323 |
| 1,371,912 | A | * | 3/1921 | Leech, Jr. | 220/323 |

(Continued)

FOREIGN PATENT DOCUMENTS

DE  1949354 U  * 11/1966
DE  2510808 A  *  9/1976

(Continued)

*Primary Examiner* — Anthony Stashick
*Assistant Examiner* — James M Van Buskirk
(74) *Attorney, Agent, or Firm* — Armstrong Teasdale LLP

(57) ABSTRACT

An apparatus operable to seal an opening in an aircraft fuel tank during a pressure test of the fuel tank is described. The apparatus includes a substantially dome shaped body having a perimeter. The body further includes a rim extending in an orthogonal direction about the perimeter and a flange extending in a normal direction from the rim and about the perimeter. The flange is sized to engage the fuel tank about the opening. The apparatus further includes a sealing gasket proximate an intersection of the rim and the flange, extending completely around the perimeter. The seal is oriented to provide a sealing function between the fuel tank and the body as pressure is increased within the fuel tank.

16 Claims, 6 Drawing Sheets

(56) References Cited

U.S. PATENT DOCUMENTS

| | | | | |
|---|---|---|---|---|
| 1,389,542 A * | 8/1921 | Wereley | | 220/327 |
| 1,403,429 A * | 1/1922 | Low | | 73/709 |
| 1,495,730 A * | 5/1924 | Eberhart | | 220/801 |
| 1,497,441 A * | 6/1924 | Henemier et al. | | 73/146.3 |
| 1,683,345 A * | 9/1928 | Geyer | | 220/378 |
| 1,790,957 A * | 2/1931 | Sykes | | 220/804 |
| 1,864,313 A * | 6/1932 | Monson | | 220/327 |
| 1,876,989 A * | 9/1932 | Lormor | | 429/185 |
| 1,904,091 A * | 4/1933 | Shoop | | 220/803 |
| 1,913,677 A * | 6/1933 | Kinzel | | 277/653 |
| 1,915,299 A * | 6/1933 | Draper | | 220/309.2 |
| 1,915,309 A * | 6/1933 | Grosser | | 220/258.3 |
| 2,001,748 A * | 5/1935 | Saalbach | | 220/319 |
| 2,013,177 A * | 9/1935 | Egan | | 220/359.1 |
| 2,040,798 A * | 5/1936 | Schoonmaker | | 215/271 |
| 2,130,637 A * | 9/1938 | Darling | | 220/203.09 |
| 2,148,995 A * | 2/1939 | Nelson | | 301/37.31 |
| 2,172,311 A * | 9/1939 | Thomas | | 222/3 |
| 2,234,485 A * | 3/1941 | Conner | | 220/803 |
| 2,303,766 A * | 12/1942 | Scherbak | | 141/65 |
| 2,328,084 A * | 8/1943 | Lomax et al. | | 220/800 |
| 2,425,612 A * | 8/1947 | Gamber | | 220/87.1 |
| 2,458,360 A * | 1/1949 | Fay et al. | | 215/302 |
| 2,543,839 A * | 3/1951 | Faris | | 220/592.2 |
| 2,552,642 A * | 5/1951 | Morrison, Jr. | | 220/203.12 |
| 2,562,609 A * | 7/1951 | Frohnapel | | 220/215 |
| 2,611,505 A * | 9/1952 | Winborn, Jr. et al. | | 220/240 |
| 2,618,978 A * | 11/1952 | Ragland | | 73/756 |
| 2,630,112 A * | 3/1953 | Zide | | 126/388.1 |
| 2,635,630 A * | 4/1953 | Cornelius | | 137/859 |
| 2,701,659 A * | 2/1955 | Baltosser | | 220/804 |
| 2,732,873 A * | 1/1956 | Treiber | | 220/200 |
| 2,746,632 A * | 5/1956 | Bramming | | 215/270 |
| 3,007,600 A * | 11/1961 | Horner | | 220/240 |
| 3,053,407 A * | 9/1962 | Lowen | | 215/341 |
| 3,064,853 A * | 11/1962 | Lents et al. | | 220/804 |
| 3,269,186 A * | 8/1966 | Hebenstreit | | 73/708 |
| 3,294,274 A * | 12/1966 | Spitzberg | | 220/803 |
| 3,320,097 A * | 5/1967 | Sugalski | | 429/55 |
| 3,414,160 A * | 12/1968 | Weber | | 220/203.18 |
| 3,602,387 A * | 8/1971 | Patnaude et al. | | 215/315 |
| 3,606,446 A * | 9/1971 | Leslie | | 296/208 |
| 3,635,369 A * | 1/1972 | Lasswell et al. | | 220/804 |
| 3,722,730 A * | 3/1973 | Joos | | 220/378 |
| 3,797,317 A * | 3/1974 | Peterson, Jr. | | 73/756 |
| 3,851,794 A * | 12/1974 | Hehl | | 220/789 |
| RE28,342 E * | 2/1975 | Lasswell et al. | | 220/804 |
| 3,921,850 A * | 11/1975 | Powers | | 220/310.1 |
| 3,937,077 A * | 2/1976 | Klamm | | 73/146.8 |
| 3,948,141 A * | 4/1976 | Shinjo | | 411/10 |
| 3,973,694 A * | 8/1976 | Tess | | 220/203.06 |
| 4,019,629 A * | 4/1977 | Dubner et al. | | 206/315.9 |
| 4,090,004 A * | 5/1978 | Tebbutt et al. | | 428/66.3 |
| 4,136,560 A * | 1/1979 | Gellos | | 73/146.8 |
| 4,162,741 A * | 7/1979 | Walker et al. | | 220/203.05 |
| 4,202,201 A * | 5/1980 | Johnson | | 73/40 |
| 4,222,276 A * | 9/1980 | DeRogatis | | 73/714 |
| 4,276,990 A * | 7/1981 | Chiodo | | 220/203.12 |
| 4,289,027 A * | 9/1981 | Gleaves et al. | | 73/299 |
| 4,290,536 A * | 9/1981 | Morel | | 220/789 |
| 4,291,816 A | 9/1981 | Lamoureux | | |
| 4,396,130 A * | 8/1983 | Robinson | | 220/316 |
| 4,502,491 A * | 3/1985 | Ender et al. | | 600/595 |
| 4,515,019 A * | 5/1985 | Woodfill | | 73/756 |
| 4,530,443 A | 7/1985 | Gorges | | |
| 4,579,248 A * | 4/1986 | Gorges | | 220/327 |
| 4,588,104 A * | 5/1986 | Danico | | 220/326 |
| 4,673,096 A * | 6/1987 | Towns et al. | | 215/230 |
| 4,674,642 A * | 6/1987 | Towns et al. | | 215/230 |
| 4,717,041 A * | 1/1988 | Elexpuru | | 220/316 |
| 4,729,339 A * | 3/1988 | Whiting | | 116/268 |
| 4,765,498 A * | 8/1988 | Rafferty | | 215/230 |
| 4,817,450 A * | 4/1989 | Jachim | | 73/866.5 |
| 4,823,727 A * | 4/1989 | Baggett et al. | | 116/272 |
| 4,848,034 A * | 7/1989 | Pace | | 49/465 |
| 4,867,334 A * | 9/1989 | Robertson et al. | | 220/243 |
| 4,885,934 A * | 12/1989 | Freeman | | 73/114.76 |
| 4,899,684 A * | 2/1990 | Houzvic et al. | | 116/272 |
| 4,899,782 A * | 2/1990 | Krejza et al. | | 137/523 |
| 4,926,704 A * | 5/1990 | Survil et al. | | 73/866.5 |
| 4,932,550 A * | 6/1990 | Moucha | | 220/203.09 |
| 4,989,745 A * | 2/1991 | Schneider | | 220/203.09 |
| 5,014,866 A * | 5/1991 | Moore | | 215/364 |
| 5,287,892 A * | 2/1994 | Sanderson et al. | | 138/92 |
| 5,316,045 A * | 5/1994 | Taylor | | 138/89 |
| 5,351,718 A * | 10/1994 | Barton | | 138/92 |
| 5,405,038 A * | 4/1995 | Chuang | | 220/231 |
| 5,427,266 A * | 6/1995 | Yun | | 220/377 |
| 5,452,819 A * | 9/1995 | Vance | | 220/303 |
| 5,505,324 A * | 4/1996 | Danico | | 220/201 |
| 5,587,192 A * | 12/1996 | Beizermann | | 426/118 |
| 5,602,340 A * | 2/1997 | Lemaire et al. | | 73/756 |
| 5,613,618 A * | 3/1997 | Raoult | | 220/369 |
| 5,641,085 A * | 6/1997 | Lonbardo | | 220/203.12 |
| 5,803,282 A * | 9/1998 | Chen et al. | | 215/228 |
| 5,806,566 A * | 9/1998 | Taylor | | 138/89 |
| 5,907,101 A * | 5/1999 | Polti et al. | | 73/714 |
| 6,039,090 A * | 3/2000 | Gunn et al. | | 141/17 |
| 6,044,756 A * | 4/2000 | Chang | | 99/472 |
| 6,364,152 B1 * | 4/2002 | Poslinski et al. | | 220/788 |
| 6,374,666 B1 * | 4/2002 | Lemberger et al. | | 73/146.8 |
| 6,375,024 B1 * | 4/2002 | Park | | 215/262 |
| 6,460,859 B1 * | 10/2002 | Hammi et al. | | 277/596 |
| 6,595,046 B2 * | 7/2003 | Lemberger et al. | | 73/146.3 |
| 6,609,865 B2 * | 8/2003 | Daigneault | | 411/13 |
| 6,669,047 B2 * | 12/2003 | Wooderson et al. | | 220/316 |
| 6,695,319 B1 * | 2/2004 | Anota et al. | | 277/628 |
| 6,719,160 B2 * | 4/2004 | Sen-Yih | | 215/361 |
| 6,786,521 B1 * | 9/2004 | Jaffke et al. | | 296/1.06 |
| 6,886,712 B2 * | 5/2005 | Hansel et al. | | 220/802 |
| 6,889,940 B1 | 5/2005 | Howe | | |
| 6,994,227 B2 * | 2/2006 | Kwon | | 220/212 |
| 7,121,155 B2 * | 10/2006 | Johansson et al. | | 73/862.621 |
| 7,131,550 B2 * | 11/2006 | Vilalta et al. | | 220/231 |
| 7,390,043 B2 * | 6/2008 | Kraus | | 296/1.06 |
| 7,455,192 B2 * | 11/2008 | Siragusa | | 220/789 |
| 7,762,420 B2 * | 7/2010 | Auwarter et al. | | 220/316 |
| 7,997,437 B2 * | 8/2011 | Jatzke et al. | | 220/359.4 |
| 2001/0023613 A1 * | 9/2001 | Lemberger et al. | | 73/146.8 |
| 2006/0006601 A1 * | 1/2006 | Hufnagel et al. | | 277/317 |
| 2006/0091144 A1 * | 5/2006 | Siragusa | | 220/789 |
| 2006/0102631 A1 * | 5/2006 | Kraus | | 220/304 |
| 2006/0137478 A1 * | 6/2006 | Johansson et al. | | 73/862.621 |
| 2006/0138068 A1 * | 6/2006 | Tsai et al. | | 215/228 |
| 2006/0186130 A1 * | 8/2006 | Jatzke et al. | | 220/789 |
| 2007/0095836 A1 * | 5/2007 | Auwarter et al. | | 220/303 |
| 2007/0095849 A1 * | 5/2007 | Kim | | 220/803 |
| 2007/0199615 A1 * | 8/2007 | Larimer et al. | | 141/95 |
| 2008/0041869 A1 * | 2/2008 | Backaert | | 220/804 |
| 2008/0290090 A1 * | 11/2008 | Kindler et al. | | 220/203.05 |
| 2009/0302036 A1 * | 12/2009 | Janny | | 220/240 |

FOREIGN PATENT DOCUMENTS

| | | | |
|---|---|---|---|
| DE | 2511845 A | * | 9/1976 |
| DE | 29719066 U1 | * | 3/1999 |

* cited by examiner

PRESSURE TEST DOOR FOR USE WITH A FUEL TANK

BACKGROUND

The field of the invention relates generally to pressure testing of chambers, and more specifically to a pressure test door that is lighter and that reduces the ergonomic impact on users of the door.

At least one currently utilized pressure test door that is utilized in pressure testing of chambers weighs about fifteen pounds. In certain applications, this door is installed to seal the chamber prior to pressure testing of the chamber. However, this pressure test door may be required to be installed in a position that is above the mechanic doing the installation. One particular embodiment of such a pressure test door requires that the user(s) engage four latching mechanisms when sealing the chamber with the pressure test door. Such a configuration is ergonomically challenging during overhead installation and removal. Safety is an issue with a tool of such weight. At the same time, there is a continuing desire to decrease installation time of such pressure test doors while also reducing the weight and the number of moving parts. Improved reliability of the seal between the pressure test door and the chamber is also desired, as well as reduction in the maintenance associated which such a pressure test door.

BRIEF DESCRIPTION

In one aspect, an apparatus operable to seal an opening in an aircraft fuel tank during a pressure test of the fuel tank is provided. The apparatus includes a substantially dome shaped body comprising a perimeter and a sealing gasket. The body further includes a rim extending in an orthogonal direction about the perimeter and a flange extending in a normal direction from the rim and about the perimeter. The flange is sized to engage the fuel tank about the opening. The sealing gasket is proximate an intersection of the rim and the flange and extends completely around the perimeter and is oriented to provide a sealing function between the fuel tank and the body as pressure is increased within the fuel tank.

In another aspect, door for sealing an opening in a vessel for pressure testing of the vessel is provided that includes a body comprising a dome shaped profile, a contour lip extending about a perimeter of the body, the contour lip having a perimeter operable for engaging an opening in the vessel, a compression seal disposed on the contour lip operable for providing a compression seal of the opening port upon pressurization of the vessel, and an indicator disposed on the contour lip, the indicator externally visible when the compression seal is compressed.

In another aspect, a door for sealing an opening in an aircraft fuel tank for purposes of pressure testing of the fuel tank is provided. The door includes a body having a dome shaped profile and a perimeter where the perimeter is substantially the same geometric shape as the opening of the fuel tank, a lip extending from the perimeter of the body where the lip defines a surface operable for engaging the fuel tank about the opening, a seal disposed on the lip operable for providing a compression sealing between the fuel tank and the door upon pressurization of the fuel tank port, and an indicator disposed on the door. The indicator is placed on the door such that it becomes visible, from a position external to the fuel tank, as the seal is compressed.

The features, functions, and advantages that have been discussed can be achieved independently in various embodiments of the present invention or may be combined in yet other embodiments further details of which can be seen with reference to the following description and drawings.

DETAILED DESCRIPTION

Figure 1:
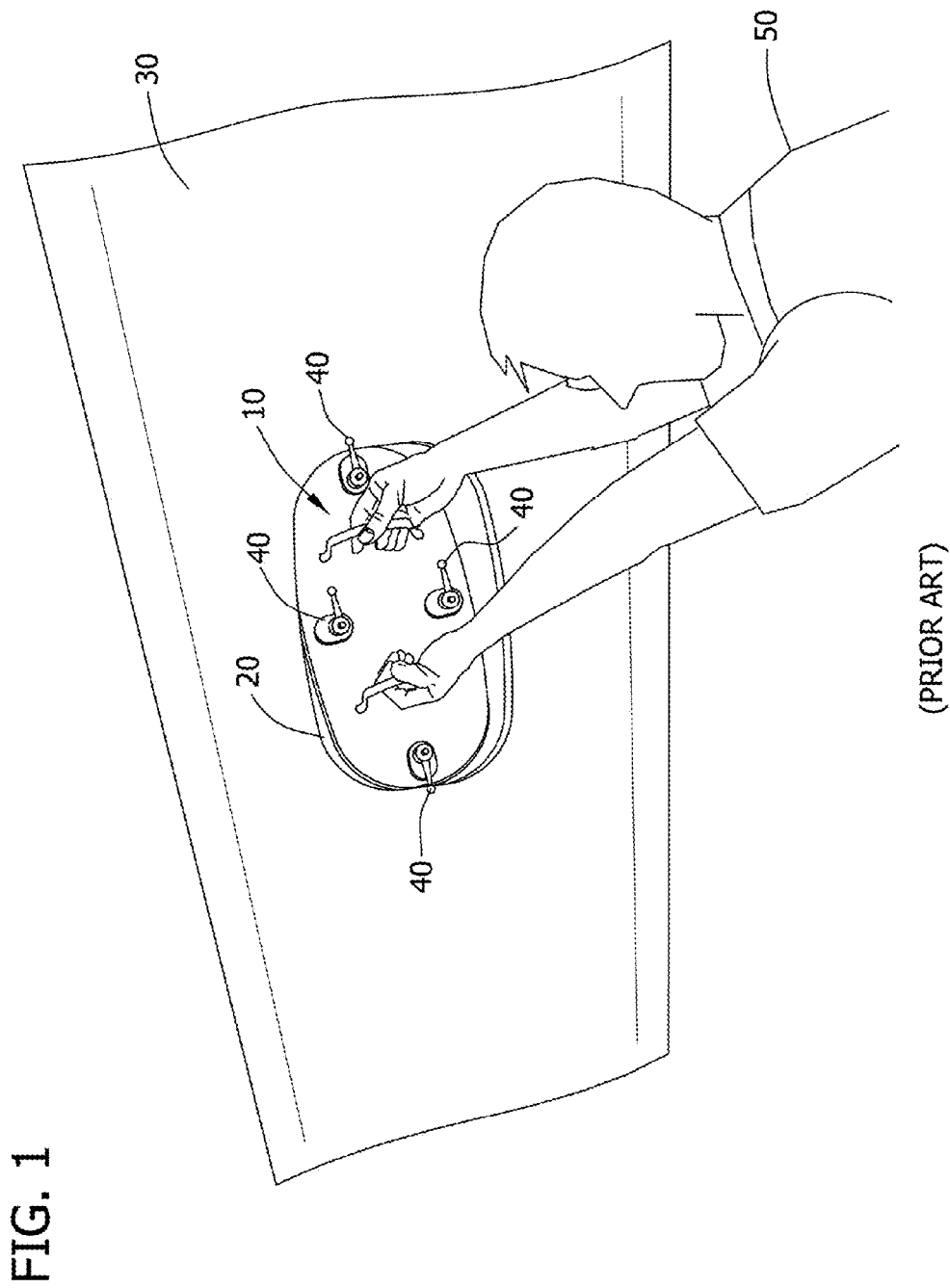
FIG. 1 is an illustration of an existing pressure test door being placed into a port associated with an aircraft fuel tank.

FIG. 1 is an illustration of an existing pressure test door 10 being placed into a port 20 associated with a fuel tank (not shown) within an aircraft wing 30. Pressure test door 10 is utilized during a pressure test associated with the fuel tank within wing 30, the port 20 providing access to the interior of the fuel tank. Pressure test door 10 has a weight of about 15 pounds and includes four latching mechanisms 40 that maintain placement of the pressure test door 10 within port 20, thereby sealing the fuel tank for the pressure test. Pressure test door 10 does not provide any indication to a user whether or not the fuel tank is pressurized. The use of latching mechanisms 40 and the weight of the door 10 results in a range of installation and removal times for the door 10, both of which have to be done by a user 50. It is desirable to provide a solution where the weight of the sealing device is reduced, as well as the amount of time a user expends installing and removing a port sealing device. It is further desirable to increase the reliability of a seal associated with a port sealing device and show an indication of pressurization of a wing fuel cell.

Figure 2:
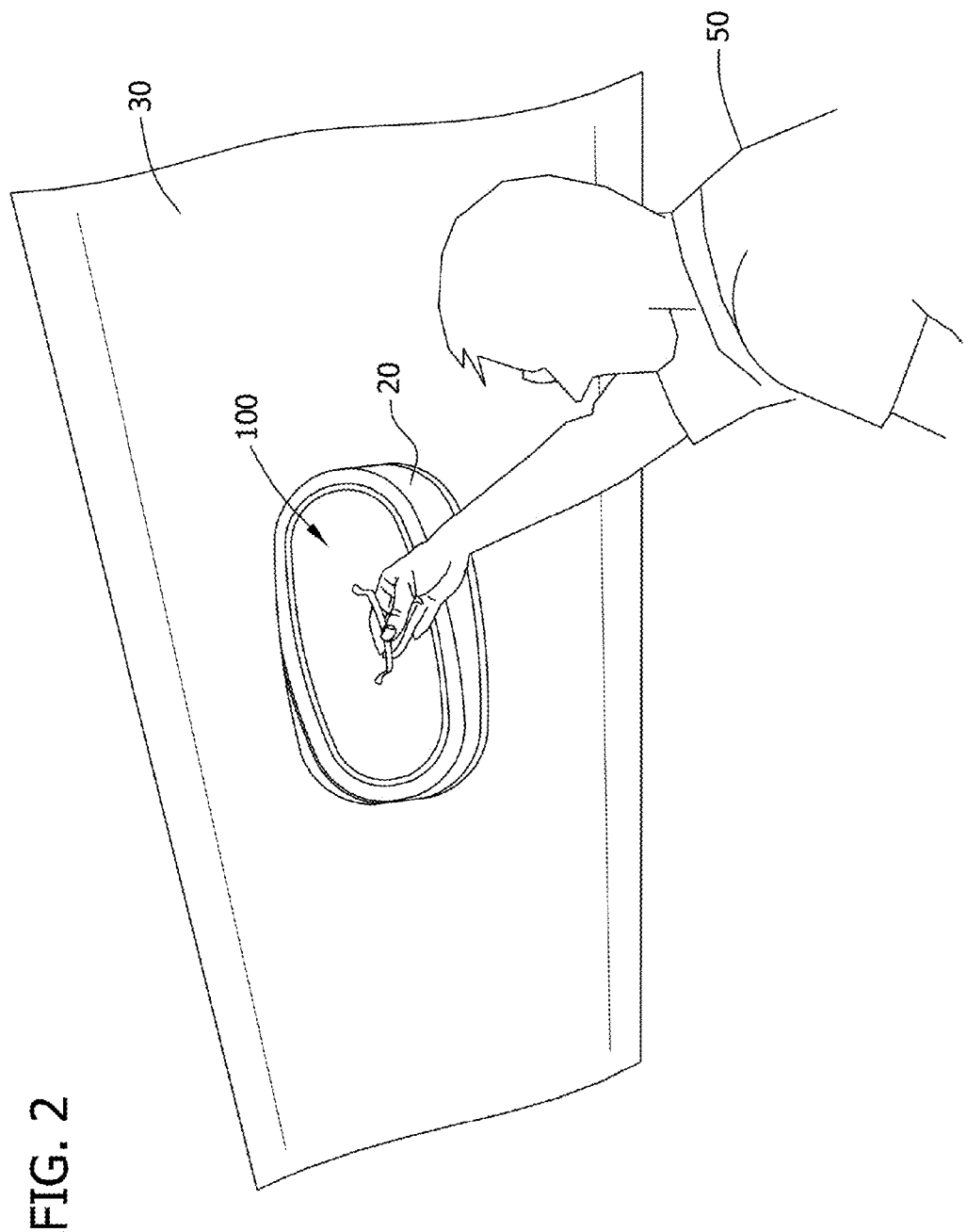
FIG. 2 is an illustration of an improved pressure test door being placed into the port shown in FIG. 1.

FIG. 2 is an illustration of a lightweight wing pressure test door 100 being installed within port 20 of wing 30 by user 50. It is noted the pressure test door 100 allows for single handed installation and removal and does not include any latching mechanisms. In one embodiment, pressure test door 100 is about two and a half pounds, includes no moving parts, and includes a pressure test indicator as further described below. As further explained herein, the reduced weight of pressure test door 100, as compared to pressure test door 10, is due to the fabrication of door 100 from composite materials 101 (shown in FIG. 4), including in one embodiment, fiber based composite materials. Other light weight materials are utilized in alternative embodiments, the materials are selected based, for example, on the necessary strength of the material under pressure. Example materials include formed titanium or aluminum (either single sheet or stiffened), and honeycomb materials. While the embodiments described herein relate to glass fiber in an epoxy matrix, due to its low cost, other composite constructions are also contemplated.

Figure 3:
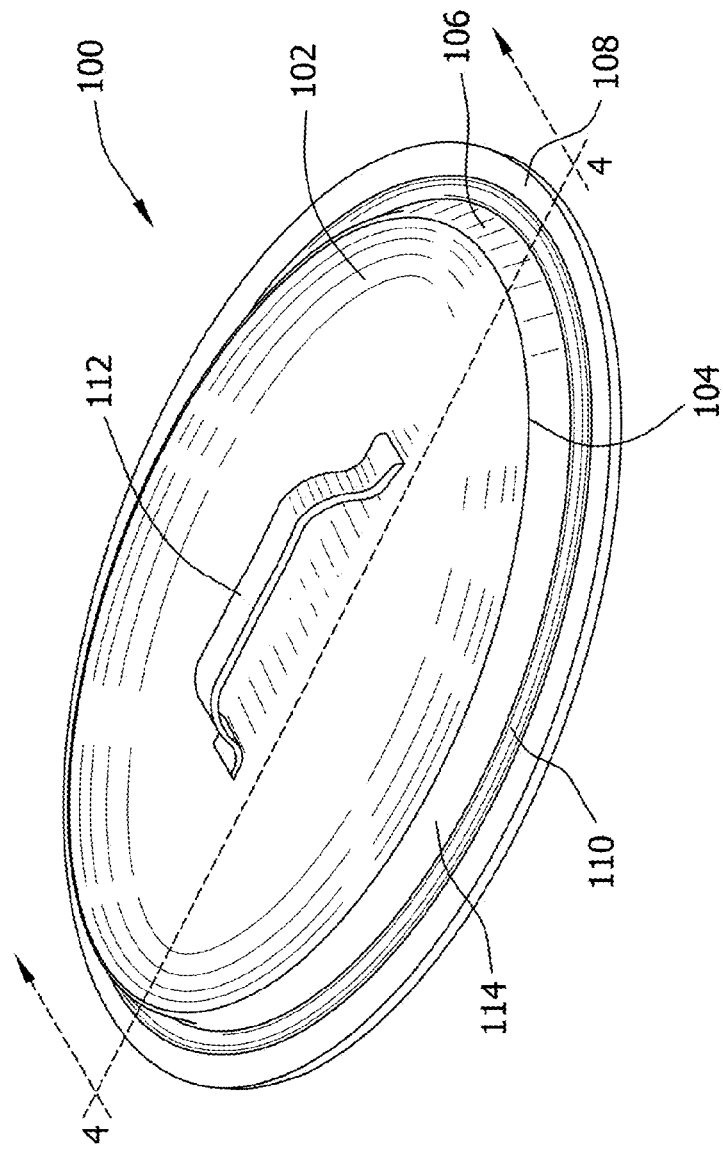
FIG. 3 is an illustration of the pressure test door shown in FIG. 2.

FIG. 3 is an illustration of lightweight pressure test door 100. Door 100 includes a substantially dome shaped body 102 that defines a perimeter 104. Extending from the perimeter 104 is a rim 106 extending in a generally orthogonal direction from about the perimeter 104 and a flange 108 extending outward in a normal direction from the rim 106 about the perimeter 104. In one embodiment, rim 106 extends at a slight angle from orthogonal to aid in centering the door 100 within an opening. More specifically, rim 106 is further operable as an alignment and centering device. The flange 108 is of a size such that it will engage the fuel tank about an opening therein. A sealing gasket 110 is disposed proximate an intersection of the rim 106 and the flange 108. The gasket 110 extends completely around the intersection of the rim 106 and the flange 108, and is oriented to provide a seal between a fuel tank and the door 100.

In one embodiment, the sealing gasket 110 is a compression lip seal, while the dome shaped body 102, the rim 106, and the flange 108 are integrally formed from composite materials. In a specific embodiment, the composite materials are fiber-based composite materials. With regard to sealing gasket 110, one embodiment is generally tubular in cross section, though many different seal cross-sections may be utilized. Embodiments of sealing gasket 110 have a combination of durometer value and seal geometry that allows the seal to conform to any mismatches that may exist between the door and the perimeter about an opening (e.g., the wing structure). For example, it is known that in one aircraft, the wing structure has a very slight longitudinal curvature.

As shown in FIG. 3, the dome shaped body 102 has a substantially elliptical shape that is similar to a port in an aircraft wing fuel tank, or fuel tank. However, other embodiments which are shaped to seal openings that have other geometric shapes are contemplated. A handle 112 is integrally formed with or separately mounted proximate a center of the dome shaped body 102 and is operable for external insertion and removal of the door 100 from a fuel tank port.

In various embodiments, the door 100 includes one or more indexed surfaces 114 on at least one of the dome shaped body 102, the rim 106, and the flange 108 to guide alignment of the door 100 within a fuel tank port opening and associated seal contact surfaces associated with the port. In one embodiment, rim 106 and flange 108 are referred to in combination as a contour lip.

Figure 4:
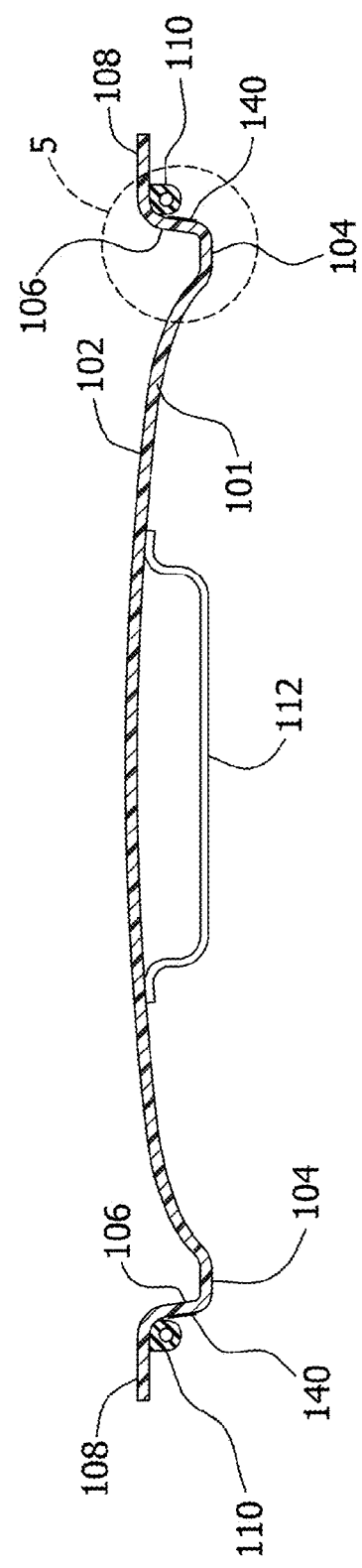
FIG. 4 is a cross-sectional view of the pressure test door of FIG. 3.

FIG. 4 is a cross-sectional view of the pressure test door 100 taken along line 4-4 shown in FIG. 3. FIG. 4 provides additional detail in regard to an overall shape of dome shaped body 102 and the relative orientation of body 102 with respect to the perimeter 104, rim 106, and flange 108. A cross-sectional view of gasket 110 is also provided.

Figure 5:
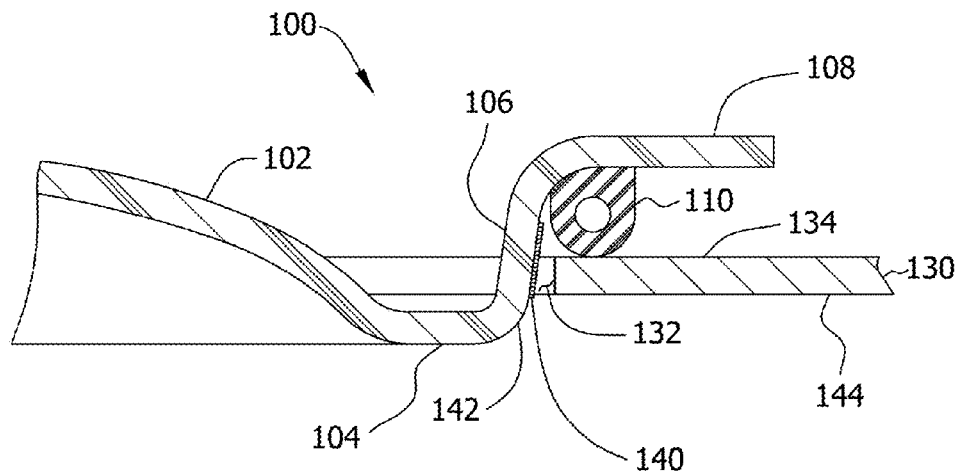
FIG. 5 is a partial cross-sectional view of the pressure test door, placed within a non-pressurized fuel tank port, illustrating a seal and a relative position of a pressure indicator.

FIG. 5 is a detailed view of an interface between door 100 and an aircraft fuel tank 130 taken along area 5 (shown in FIG. 4), and as door 100 is placed within an opening 132 associated with fuel tank 130. From the cross-sectional view of FIG. 5, it is apparent that sealing gasket 110 engages the fuel tank interior surface 134 about a perimeter defined by the opening 132. A pressure indicator 140 placed on an outer surface 142 of rim 106 is not plainly visible to a user when the fuel tank is not pressurized. The indicator 140, disposed on the rim 106, provides a direct indication of a pressurization force within the fuel tank. Since pressure indicator 140 is not plainly visible in FIG. 4, and sealing gasket 110 is not compressed, the tank does not appear to be pressurized. In one embodiment, pressure indicator 140 is an indicating strip or band adhesively attached to and running around the outer surface of perimeter 104.

Figure 6:
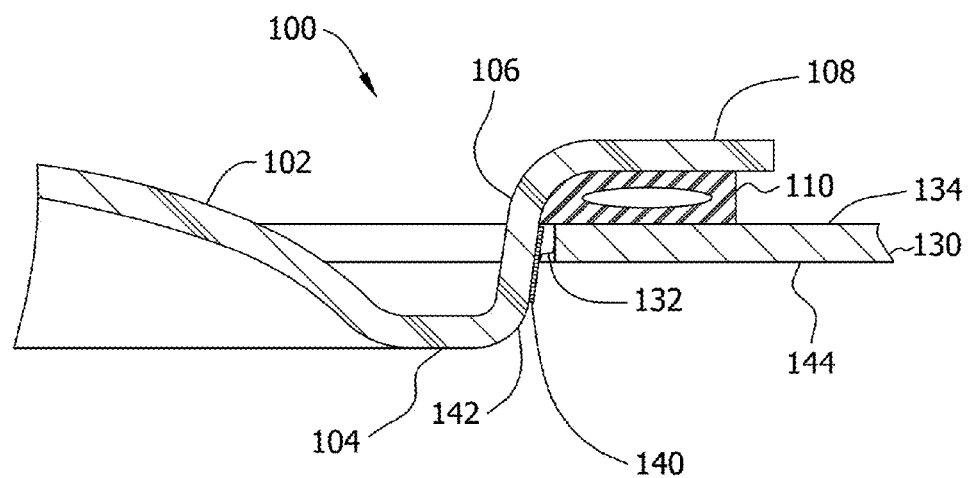
FIG. 6 is a partial cross-sectional view of the pressure test door, placed within a pressurized fuel tank port, illustrating that the seal has been compressed and a shift in the relative position of the pressure indicator.

FIG. 6 illustrates the changes to certain components of door 100 once the fuel tank is pressurized. The sealing gasket 110 is now compressed against the fuel tank interior surface 134. In addition, the indicator 140 is now plainly visible to a user as it is now below an external surface 144 of the fuel tank 130. In one particular embodiment, the indicator 140 includes one or more color bands that become visible to a user as the sealing gasket 110 is compressed. In another embodiment, the indicator 140 includes multiple color bands. Visibility of a specific color band is indicative of a degree of pressurization of the fuel tank 130 and a degree of compression of the sealing gasket 110, which in one embodiment is a compression seal.

Figure 7:
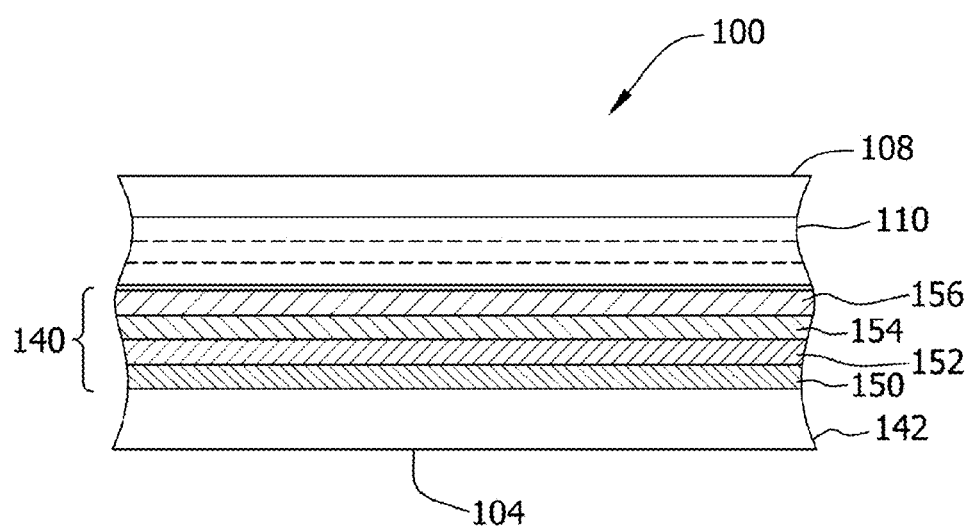
FIG. 7 is a partial side view of the pressure test door illustrating pressure indicating bands attached thereto.

FIG. 7 is a partial side view of the pressure test door 100 further illustrating one embodiment of pressure indicator 140 that includes a plurality of bands attached to the door 100. In the embodiment, pressure indicator 140 include four bands, though more or fewer could be incorporated. Multiple embodiments are envisioned. For example, visibility of band 150 may indicate that the door is properly placed within the fuel tank opening, visibility of band 152 is indicative of sealing of the tank and further indicative of a first pressure within the fuel tank, visibility of band 154 is indicative of a second (increased) pressure within the fuel tank, and visibility of band 156 may be indicative of too much pressure within the fuel tank.

Test door 100 is a lightweight alternative which allows for one touch installation and removal into a wing tank opening. As described above, there is a built in test indicator 140 that is visible to show a pressure test is in progress. Utilizing composite materials 101 to make the pressure test doors 100 resulted in a decrease in the overall weight of the door 100, but the dome shaped body also provided an increase in the structural load limits of the test door 100 as compared to test door 10. Specifically, the dome shaped body 102 of door 100 provides for stiffness and strength.

In addition, door 100 is less expensive to fabricate than is door 10. Test door 100 is an item capable of providing a reduction in process flow time, an increase in production, reduction of manpower, and a safe and more ergonomic tool that can be utilized, for example, by mechanics and assemblers. Additional advantages that door 100 provides are that it is easier to store and takes less room to store, and there are no moving parts to get damaged or worn.

The composite door described herein provides the desired sealing function at a significantly reduced weight over prior sealing doors made from metal. In addition, a direct and progressive indication of the pressurization level within the wing cell is also presented. This indication occurs as the seal compresses under internal gas pressure, exposing the test indicator 140. In one embodiment, a color strip running around the perimeter of the door functions as the test indicator 140. The color strip can be a single, solid color. Alternatively, the test strip can be strips of various colors indicating various pressure values in the wing fuel cell.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus operable to seal an opening in an aircraft fuel tank during a pressure test of the fuel tank, said apparatus comprising:

a substantially dome shaped body comprising a perimeter, said body further comprising a rim extending in an orthogonal direction about the perimeter and a flange extending in a normal direction from said rim and about the perimeter, said body removably coupled to the fuel tank to provide selective access to an interior of the fuel tank;

a sealing gasket proximate an intersection of said rim and said flange, extending completely around the perimeter, said sealing gasket oriented to provide a sealing function between the fuel tank and said body as pressure is increased within the fuel tank; and an indicator coupled to said rim and extending about said perimeter of said dome shaped body, said indicator separate from said sealing gasket and comprising at least one band oriented to provide a direct indication of a range of pressurization force within the fuel tank.

2. The apparatus according to claim 1 wherein said sealing gasket comprises a compression lip seal.

3. The apparatus according to claim 1, wherein said indicator comprises a plurality of indicators, each said indicator indicative of a respective pressure range within the fuel tank.

4. The apparatus according to claim 1 wherein said dome shaped body, said rim and said flange are integrally formed from composite materials.

5. The apparatus according to claim 1 wherein said dome shaped body, said rim and said flange are integrally formed from fiber-based composite materials.

6. The apparatus according to claim 1 wherein said dome shaped body comprises an elliptical shape.

7. The apparatus according to claim 1 further comprising a handle integrally formed or separately mounted proximate a center of said dome shaped body, said handle operable for external insertion and removal of said apparatus from the opening.

8. The apparatus according to claim 1 further comprising indexed surfaces defined across at least one of said dome shaped body, said rim and said flange to guide alignment of said apparatus with a fuel tank port and associated seal contact surfaces of the opening.

9. A door for sealing an opening in a vessel for pressure testing of the vessel, said door comprising:

a body comprising a dome shaped profile, said body removably coupled to the vessel to provide selective access to an interior of the vessel;

a contour lip extending about a perimeter of said body, said contour lip having a perimeter operable for engaging an opening of the vessel;

a compression seal disposed on said contour lip and operable for compression sealing the opening; and an indicator coupled to said contour lip, said indicator separate from a compression seal and comprising at least one band oriented to provide a direct indication of a range of pressurization force within the vessel.

10. The door according to claim 9, wherein said at least one band comprises multiple color bands, visibility of a specific color band indicative of a respective degree of pressurization within the vessel and a respective degree of compression of said compression seal.

11. The door according to claim 9 wherein said indicator comprises an adhesive band extending about said contour lip.

12. The door according to claim 9 wherein at least one of said body and said contour lip comprises indexed surfaces to guide self alignment of said door within the opening of the vessel.

13. The door according to claim 9 wherein said body and said contour lip are integrally formed from composite materials.

14. The door according to claim 9 wherein said body and said contour lip are integrally formed from fiber-based composite materials.

15. The door according to claim 9 further comprising a handle integrally formed or separately mounted proximate a center of said body, said handle operable for external insertion and removal of said door from the opening.

16. A door for sealing an aircraft fuel tank for purposes of pressure testing of the fuel tank, the aircraft fuel tank including an opening to access an interior of the fuel tank, said door comprising:

a body comprising a dome shaped profile and an outer sidewall, said body removably coupled to the fuel tank to provide selective access to an interior of the fuel tank;

a lip extending from said outer sidewall, said lip defining a surface operable for engaging the fuel tank about the opening;

a seal disposed on said lip, said seal operable for providing a compression sealing between the fuel tank and said door; and an indicator coupled to said outer sidewall, said indicator separate from said seal and comprising at least one band oriented to provide a direct indication of a range of pressurization force within the fuel tank.

* * * * *